United States Patent [19]

Okuma et al.

[11] Patent Number: 5,064,950

[45] Date of Patent: Nov. 12, 1991

[54] FINE CELLULOSE PARTICLES AND PROCESS FOR PRODUCTION THEREOF

[75] Inventors: Shigeru Okuma, Hofu; Kanji Yamagishi; Masami Hara, all of Hofu; Keizo Suzuki, Osaka; Toshihiro Yamamoto, Hofu; Hideo Yoshidome, Kishiwada, all of Japan

[73] Assignees: Kanebo, Ltd., Tokyo; Kanebo Rayon, Ltd., Osaka, both of Japan

[21] Appl. No.: 528,933

[22] Filed: May 25, 1990

Related U.S. Application Data

[62] Division of Ser. No. 107,973, Oct. 13, 1987, Pat. No. 4,946,953.

[30] Foreign Application Priority Data

Oct. 16, 1986 [JP] Japan ................................ 61-244044
Aug. 27, 1987 [JP] Japan ................................ 62-211354

[51] Int. Cl.$^5$ ............................ C08J 3/16; C08L 1/02; C08B 15/10
[52] U.S. Cl. ..................................... 536/57; 536/124; 536/126
[58] Field of Search ........................... 536/57, 124, 126

[56] References Cited

U.S. PATENT DOCUMENTS

| | | | |
|---|---|---|---|
| 3,501,419 | 3/1970 | Bridgeford | 521/78 |
| 4,055,510 | 10/1971 | Peska et al. | 252/426 |
| 4,169,121 | 9/1979 | Pietsch et al. | 264/103 |
| 4,312,980 | 1/1982 | Motozato et al. | 536/76 |
| 4,461,892 | 7/1984 | Nishikawa et al. | 536/65 |
| 4,536,217 | 8/1985 | Loth et al. | 106/122 |
| 4,551,389 | 11/1985 | Ohtake et al. | 428/402 |

FOREIGN PATENT DOCUMENTS 342182 3/1978 Austria.
0200973 12/1986 European Pat. Off..
2272730 12/1975 France.

*Primary Examiner*—Nathan M. Nutter
*Attorney, Agent, or Firm*—Flynn, Thiel, Boutell & Tanis

[57] ABSTRACT

Fine crosslinked cellulose particles, wherein (1) said cellulose particles are composed substantially of a II-type cellulose crystalline phase and a non-crystalline cellulose phase, (2) said cellulose particles have a crystallinity, determined by X-ray diffractometry, of 5 to 35%, (3) said cellulose particles consist substantially of spherical to elongated spherical particles having an average particle diameter of not more than 300 μm, and (4) said cellulose particles having an exclusion limit molecular weight by polyethylene glycol of not more than 4,000. The particles may have crosslinkage among the cellulose molecular chains in the non-crystalline phase. The fine crosslinked cellulose particles are prepared by (1) preparing fine particles of a coagulated viscose of cellulose xanthate, (2) subjecting the fine particles of coagulated viscose to crosslinking reaction and then neutralizing them with an acid, or first neutralizing said fine particles with an acid and then subjecting the neutralized particles to crosslinking reaction, and (3) separating the resulting fine crosslinked cellulose particles from the mother liquor, and heat-treating them after optionally subjecting them to desulfurization or to washing with an acid, water or methanol.

8 Claims, 6 Drawing Sheets

FINE CELLULOSE PARTICLES AND PROCESS FOR PRODUCTION THEREOF

This is a division of Ser. No. 07/107,973 filed Oct. 13, 1987 and now U.S. Pat. No. 4,146,953.

This invention relates to fine cellulose particles and a process for production thereof. More specifically, it relates to fine non-crosslinked cellulose particles composed substantially of regenerated cellulose and having an exclusion limit molecular weight in liquid chromatography of not more than 3,000, or fine crosslinked cellulose and having an exclusion limit molecular weight in liquid chromatography of not more than 4,000, and processes for production thereof.

Particles of cellulose or its derivatives have recently found extensive use in various fields as chromatographic materials, polymeric carriers, cosmetic additives, lubricants, etc.

Highly pure microcrystalline cellulose developed by FMC of U. S. A. has been well known as fine cellulose particles. It is known that this highly pure microcrystalline cellulose is produced by selecting a particularly highly pure pulp, hydrolyzing it with a mineral acid under given conditions, washing the hydrolyzate to remove the noncrystalline region, and thereafter grinding, purifying and drying the remainder (see a pamphlet entitled "Crystalline Cellulose, Avicel ®" published by Asahi Chemical Industry Co., Ltd. on Mar. 1, 1983). This pamphlet shows that chemically, this highly pure microcrystalline cellulose is natural cellulose itself, i.e. I-type cellulose, and is marketed in average particle diameters ranging from as small as about 6 $\mu$m to as large as about 40.$\mu$m or even about 120 $\mu$m. Investigations of the present inventors have shown that this highly pure microcrystalline cellulose (grade PH-M06) has a relatively good crystalline character with a crystallinity of about 31 to 35%.

Japanese Laid-Open Patent Publication No. 21,738/1973 discloses a process in which a viscose having a gamma value of at least 50 and an average degree of polymerization of at least 400 is let fall in particles into a coagulation-regeneration bath having a low acid concentration and a low anhydrous sodium sulfate concentration to coagulate and regenerate it gradually, and describes in its working example regenerated cellulose particles having a size of 30 to 46 mesh (300 to 590$\mu$m).

Japanese Patent Publication No. 21,761/1981 discloses a process which comprises extruding a viscose from a discharge opening, allowing it to change spontaneously from a continuous flow to a liquid droplet flow in air, and feeding it as nearly spherical liquid droplets into a coagulation-regeneration bath. It describes that cellulose particles having a size of 16 to 170 mesh (88 to 1168$\mu$m) can be obtained by this process.

Japanese Patent Publication No. 7162/1982 discloses hollow fine particles of regenerated cellulose having a large void nearly centrally in each particle, and describes that these particles have an apparent density of not more than 0.4 g/cm$^3$ and a particle size of 16 to 170 mesh.

Japanese Laid-Open Patent Publication No. 60,753/1973 discloses a process for producing porous regenerated cellulose particles having a size of 16 to 170 mesh by using a coagulation-regeneration bath having a higher acid concentration and a higher anhydrous sodium sulfate concentration than in the process disclosed in the above-cited Japanese Laid-Open Patent Publication No. 21,738/1973.

Japanese Patent Publication No. 89,748/1974 discloses a process for producing a cellulose powder having a length/diameter ratio of from 20/1 to 2/1 and a length of not more than 1 mm which comprises hydrolyzing a fibrous material of regenerated cellulose, and drying and pulverizing the hydrolyzed product.

Japanese Laid-Open Patent Publication No. 212,231/1982 discloses a process for producing a cellulose powder from a fibrous material of natural cellulose in the same way as above.

Japanese Patent Publication No. 45,254/1982 and U.S. Pat. No. 4,055,510 corresponding to it disclose that particles 83% by volume of which consists of particles with a particle diameter of 150 to 350$\mu$m are obtained by heating a suspension of viscose in water-immiscible liquid such as chlorobenzene to 30° to 100° C. while it is continuously stirred, and then decomposing by acid the resulting solid particles (Example 1).

Japanese Patent Publication No. 39,565/1980 discloses a process for producing spherical particles of cellulose which comprises adding a methylene chloride or chloroform solution of cellulose triacetate dropwise with stirring to an aqueous medium having a dispersing agent such as gelatin or polyvinyl alcohol dissolved therein, heating the mixture to form spherical particles of cellulose triacetate, and thereafter saponifying the particles. A working example of this patent document discloses cellulose particles with a size of 30 to 500$\mu$m.

Japanese Laid-Open Patent Publication No. 40,618/1980 discloses a process for producing cellulose particles having a particle diameter of 50 to 500$\mu$m from a cellulose ester other than cellulose triacetate by quite the same method as above.

Japanese Laid-Open Patent Publication No. 28,763/1980 discloses a process for producing microspherical particles which comprises spray-drying a solution of a cellulose fatty acid ester in a mixture of at least three solvents having boiling points at least 30° C. different from each other.

Japanese Laid-Open Patent Publication No. 24,429/1981 and U.S. Pat. No. 4,312,980 corresponding to it disclose a process for producing porous spherical particles of cellulose which comprises suspending in an aqueous medium a solution of cellulose triacetate in a mixed solvent of a chlorinated hydrocarbon having a lower boiling point than the aqueous medium and a higher aliphatic alcohol having at least 6 carbon atoms to form droplets of the solution, then evaporating the chlorinated hydrocarbon in the liquid droplets, saponifying the spherical particles of cellulose triacetate containing the higher aliphatic alcohol, and removing the higher aliphatic alcohol from the spherical particles. A working example in this patent document discloses particles having a particle diameter of 100 to 200$\mu$m.

Japanese Laid-Open Patent Publication No. 24,430/1981 discloses a process for producing porous spherical particles of cellulose, which comprises dissolving a triacetate ester of crystalline cellulose having a fixed degree of polymerization in a chlorinated hydrocarbon having a lower boiling point than an aqueous medium A, suspending the solution in the aqueous medium A to form droplets of the solution, then evaporating the chlorinated hydrocarbon from the liquid droplets, and saponifying the resulting spherical particles of cellulose triacetate. A working example of this patent document discloses porous spherical particles of cellulose having a particle diameter of 100 to 200 μm.

Japanese Laid-Open Patent Publication No. 38,801/1982 and corresponding European Patent No. 47,064 and U.S. Pat. Nos. 4,390,691 and 4,461,892 describe a process for producing porous particles of cellulose, which comprises suspending a solution of an organic acid ester of cellulose in a solvent composed mainly of a chlorinated hydrocarbon in an aqueous medium to form droplets of the solution, evaporating the chlorinated hydrocarbon from the droplets to form spherical particles of the organic acid ester of cellulose, and then saponifying the spherical particles, wherein an acid or an alkali is added to and mixed with the aqueous medium before the cellulose ester solution is suspended in it. A working example of this patent document describes porous spherical cellulose particles having a particle diameter of 50 to 100 μm and an exclusion limit molecular weight of about 2,000.

These processes, however, have the defect that the produced particles have a low crystallinity, and when the gels have a small particle diameter, they have inferior resistance to pressure at high speeds.

Motozato et al. reported that partial cross-linking of porous cellulose gels destroyed hydrogen bonding in the cellulose gels and increased the network structure in the inside of the gels and also the exclusion limit molecular weight, and that if the crosslinking is permitted to proceed further, the network structure is gradually reduced and the exclusion limit molecular weight of the gels is gradually decreased (Yoshiaki Motozato, Kazuaki Matsumoto, Chuichi Hirayama, Journal of Japanese Chemical Society, 1981, 1883–1889). For example, Table 9 of this paper describes that as porous cellulose gel having an exclusion limit molecular weight of 4,600 is crosslinked with epichlorohydrin, its exclusion limit molecular weight increases and reaches a maximum of 11,000 at a certain degree of crosslinking, and that as the crosslinking proceeds further, its exclusion limit molecular weight gradually decreases and reaches 6,000.

Japanese Laid-Open Patent Publication No. 159,801/1982 discloses a process for producing cellulose gel particles which comprises dissolving cellulose in a solution of paraformaldehyde in dimethyl sulfoxide, dispersing the solution in a liquid, mixing the dispersion with a coagulant for cellulose to gel and flocculate the dispersed liquid droplets of cellulose, and as required regenerating cellulose particle with hot water.

Japanese Laid-Open Patent Publication No. 159,802/1982 discloses a process for producing porous cellulose, which comprises immersing particulate cellulose in a solution of paraformaldehyde in dimethyl sulfoxide, and swelling it by heating.

Japanese Patent Publication No. 219,333/1982 discloses a process for producing spherical fine particles of cellulose acetate, which comprises mixing an organic solvent solution of cellulose acetate and an aqueous medium containing a dispersing agent, a surface-active agent and a defoamer with stirring for at least 10 seconds by means of a rotating vane at a rotating speed of at least 2,000 rpm while the peripheral speed of the vane is maintained at 450 m/min. or higher, and evaporating the organic solvent.

Japanese Laid-Open Patent Publication No. 30,752/1973 discloses a process for producing a cellulose powder, which comprises treating cellulose with tetrahydrofuran, and pulverizing the treated cellulose.

Japanese Laid-Open Patent Publication No. 105,758/1975 discloses a process for producing a fine powder of cellulose, which comprises passing a dry cellulose sheet between a pair of rotating rolls under pressure, and thereafter hydrolyzing the cellulose sheet with a mineral acid.

It is an object of this invention to provide fine particles of cellulose consisting substantially of regenerated cellulose or II-type cellulose and having an exclusion limit molecular weight by polyethylene glycol of less than several thousand.

Another object of this invention is to provide fine crosslinked cellulose particles composed substantially of regenerated cellulose or II-type cellulose in the crystalline phase and having an exclusion limit molecular weight by polyethylene glycol of not more than 4,000.

Still another object of this invention is to provide fine non-crosslinked cellulose particles composed substantially of regenerated cellulose or II-type cellulose and having an exclusion limit molecular weight by polyethylene glycol of not more than 3,000.

Yet another object of this invention is to provide fine crosslinked or non-crosslinked cellulose particles useful as a liquid chromatographic filler used to separate proteins from salts such as sodium chloride, ammonium sulfate, ammonium chloride, calcium chloride and sodium sulfate (desalting).

A further object of this invention is to provide a novel process for producing the aforesaid crosslinked or non-crosslinked cellulose particles of the invention.

Other objects of the invention along with its advantages will become apparent from the following description.

According to this invention, the above objects and advantages are achieved firstly by fine crosslinked cellulose particles, wherein (a) said cellulose particles are composed substantially of a II-type cellulose crystalline phase and a non-crystalline cellulose phase, (b) crosslinkage exists among the cellulose molecular chains in the non-crystalline phase, (c) said cellulose particles have a crystallinity, determined by X-ray diffractometry, of 5 to 35%, (d) said cellulose particles consist substantially of spherical to elongated spherical particles having an average particle diameter of not more than 300 μm, and (e) said cellulose particles having an exclusion limit molecular weight by polyethylene glycol of not more than 4 000.

Figure 1:
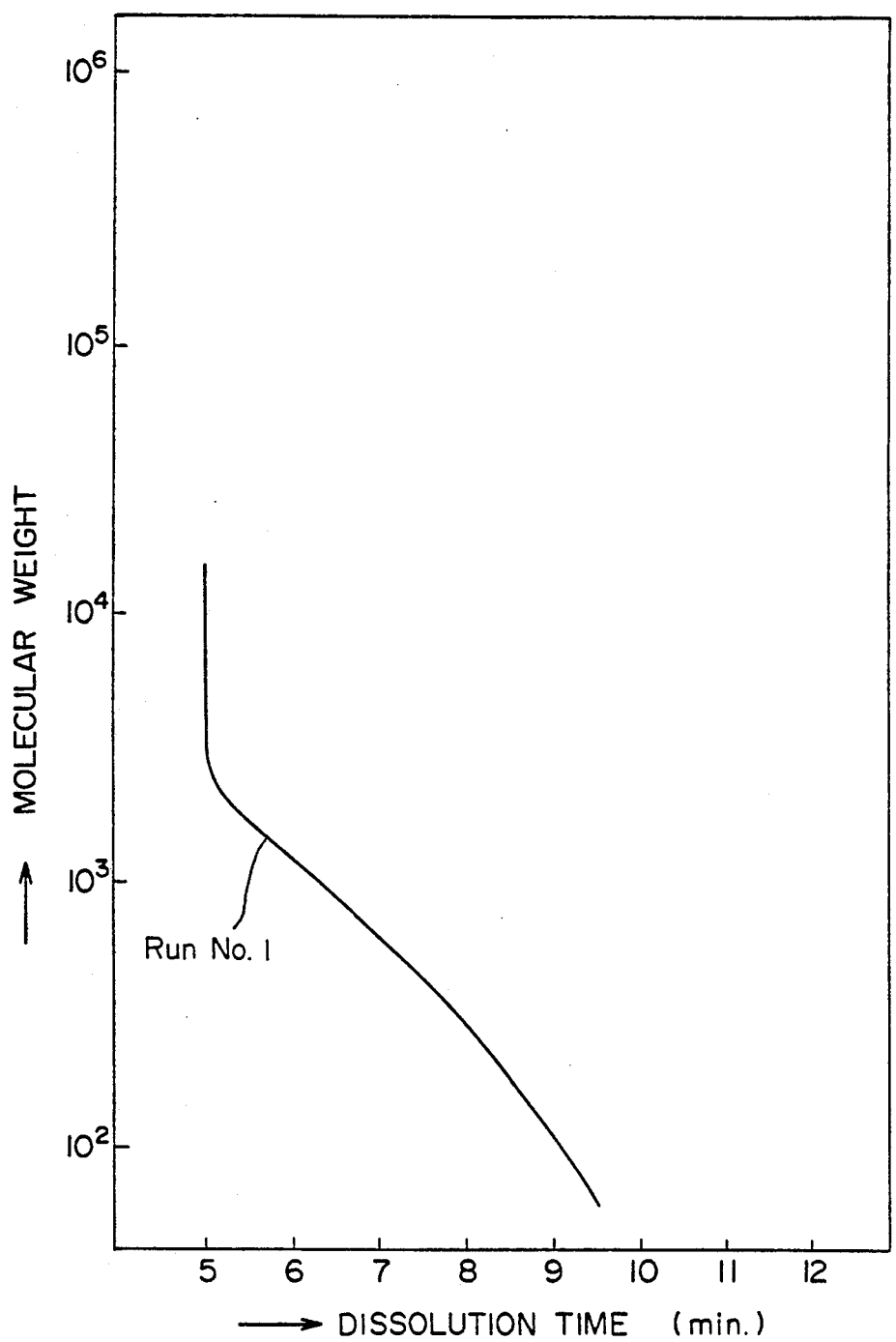
FIG. 1 of the accompanying drawings is a diagram showing the relation between the molecular weight of polyethylene glycol and the elution time, which shows the separating function of the fine crosslinked cellulose particles of the invention obtained in Run No. 1 (Example 1) as a liquid chromatographic filler.

According to this invention, the fine cross-linked cellulose particles can be produced by a process which comprises (1) preparing fine particles of a coagulated viscose containing 5 to 60% by weight, calculated as cellulose, of cellulose xanthate, (2) subjecting the fine particles of coagulated viscose to crosslinking reaction and then neutralizing them with an acid, or first neutralizing said fine particles with an acid and then subjecting the neutralized particles to crosslinking reaction, and (3) separating the resulting fine crosslinked cellulose particles from the mother liquor, and heat-treating them after optionally subjecting them to desulfurization or to washing with an acid, water or methanol.

The fine crosslinked cellulose particles of this invention are characterized by having the above requirements (a) to (e). These requirements will be described in detail below.

The fine crosslinked cellulose particles of this invention firstly are composed substantially of a II-type cellulose crystalline phase and a non-crystalline cellulose phase. Hence, fine particles composed of natural cellulose, i.e. I-type cellulose, are totally different from the particles of this invention II-type cellulose and I-type cellulose, as is well known, are differentiated by X-ray diffraction. The X-ray diffraction pattern of II-type cellulose does not substantially have a diffraction peak at a diffraction angle (2θ) of 15° which is clearly existent in the X-ray diffraction pattern of I-type cellulose.

Secondly, in the non-crystalline cellulose phase, crosslinkage exists among the cellulose molecular chains. In other words, its X-ray diffraction pattern clearly shows the existence of diffraction peaks in the vicinity of a diffraction angle (2θ) of 20° ascribed to the (101) plane and (002) plane of II-type cellulose.

The crosslinkage among the cellulose molecules present in the non-crystalline cellulose phase effects bridging of the hydroxyl groups of the cellulose molecules to one another via the molecules of the crosslinking agent.

The degree of crosslinkage in the case of using epichlorohydrin, for example, as the crosslinking agent can be specified by the absorbance of an absorption peak assigned to the CH stretching vibration of alkylene in the infrared absorption spectrum of the cellulose particles determined by the KBr tablet method. Preferably, the cellulose particles have an absorbance of 0.065 to 0.156 mg$^{-1}$.cm$^{-2}$, more preferably 0.094 to 0.140 mg .cm Thirdly, the fine crosslinked cellulose particles of this invention have a crystallinity, determined by X-ray diffractometry, of 5 to 35%, preferably 7 to 35%, more preferably 10 to 35%. The fine crosslinked cellulose particles of the invention are not amorphous, but crystalline as defined by the above crystallinity.

Fourthly, the fine crosslinked cellulose particles of the invention are composed substantially of spherical to elongated spherical particles having an average particle diameter of as small as not more than 300 μm. Preferably, the fine crosslinked cellulose particles of the invention have an average particle diameter of 2 to 150 μm. Particularly, particles with a size of not more than 20 μm have excellent pressure resistance and are suitable for use in high-performance liquid chromatography. The fine crosslinked cellulose particles of the invention are composed substantially of spherical or elongated spherical particles. The term "elongated spherical", as used in the present specification and claims, is a generic term which is meant to include, for example, an ellipse, an elongated circle, a peanut-shape and an oval shape as the shape of a projected view or a top plan view of each of the cellulose particles. Accordingly, the spherical or elongated spherical fine crosslinked cellulose particles differ from angled or irregularly-shaped particles.

Fifthly, the fine crosslinked cellulose particles are required to have an exclusion limit molecular weight by polyethylene glycol of not more than 4,000. The exclusion limit molecular weight can be determined by filling a column with the fine crosslinked cellulose particles swollen with water and then using standard polyethylene glycol having a known molecular weight. If the exclusion limit molecular weight exceeds 4,000, the cellulose particles have a reduced ability to separate compounds having a molecular weight of not more than 4,000 from salts. To separate compounds having lower molecular weights with good efficiency, the cellulose particles preferably have an exclusion limit molecular weight of not more than 3,000, more preferably not more than 2,000, especially preferably not more than 1,500.

Secondarily, the fine crosslinked cellulose particles of this invention are further characterized by the following properties.

Preferably, the cellulose constituting the fine crosslinked cellulose particles of this invention have a degree of polymerization of usually 100 to 700. If it exceeds 700, the fine cellulose particles tend to be deformed and it is difficult to obtain uniform particles.

Preferably, the fine crosslinked cellulose particles of this invention have a fractionation index (F) defined by the following equation, $$F = \frac{V_E - V_D}{V_D}$$

wherein $V_D$ is the volume (ml) of blue dextran (molecular weight 2 million) eluted, and $V_E$ is the volume (ml) of ethylene glycol eluted, of at least 0.6. To separate high-molecular-weight compounds such as proteins efficiently from salts, the cellulose particles preferably have as high a fractionation index as possible. Preferably the fractionation index of the fine cellulose particles of this invention is at least 0.8. According to this invention, fine cellulose particles having a fractionation index of more than 1.0 can be obtained.

The fine crosslinked cellulose particles of the invention have a fractionation index of preferably 2 at most, more preferably 1.5 at most.

Further, it is preferred that the fine cross-linked cellulose particles have a pressure resistance in the wet state of at least 5 kg/cm², particularly at least 10 kg/cm², when packed into a column. In order to separate a high-molecular-weight compound such as proteins from salts in large quantities within a short period of time on an industrial scale, fine cellulose particles having higher pressure resistance in the wet state are more useful and preferred. According to this invention, fine crosslinked cellulose particles having a pressure resistance in the wet state of more preferably at least 40 kg/cm², especially at least 80 kg/cm², can be produced. In a given column, the pressure of the column increases with decreasing particle diameter of the fine cellulose particles. Fine cellulose particles of this invention having a particle diameter of 10 μm can withstand a column pressure of 80 kg. The invention, therefore, has the great advantage that it permits selection of various particle diameters depending upon the desired separation accuracy and the amount of materials to be treated.

The process for producing the fine crosslinked cellulose particles of this invention will be described below.

According to the process of this invention fine particles of coagulated viscose containing 5 to 60% by weight, calculated as cellulose, of cellulose xanthate are prepared in the first step. In the second step, the coagulated viscose particles are subjected to crosslinking reaction and then neutralized with an acid, or they are first neutralized with an acid and then subjected to crosslinking reaction. In the third step, the fine cross-linked cellulose particles are separated from the mother liquor, and then heat-treated after optionally subjecting them to desulfurization or to washing them with an acid, water or methanol.

The coagulated viscose particles used in the first step can be produced firstly by a method which comprises (A) preparing an alkaline aqueous polymer solution of cellulose xanthate and a first water-soluble polymeric compound other than cellulose xanthate, (B) mixing the alkaline aqueous polymer solution with a second water-soluble anionic polymeric compound to form a dispersion of fine particles of the alkaline aqueous polymer solution, and (C) heating the dispersion, or mixing the dispersion with a coagulating agent for cellulose xanthate, thereby to coagulate cellulose xanthate in the dispersion as fine particles containing the first water-soluble polymeric compound.

Secondly, the coagulated viscose particles used in the first step may also be produced by a method which comprises (A) preparing an alkaline aqueous polymer solution of cellulose xanthate and a first water-soluble polymeric compound other than cellulose xanthate, (B) mixing the alkaline aqueous polymer solution with water-soluble polyethylene glycol having a number average molecular weight of at least 1,500 or a derivative thereof at a temperature of at least 55° C. to form a dispersion of fine particles of the alkaline aqueous polymer solution, and (C) heating the dispersion at a temperature equal to, or higher than, that at which the dispersion is formed in step (B), thereby to coagulate cellulose xanthate in the dispersion as fine particles containing the first water-soluble polymeric compound.

The above first and second methods are basically comprised of (A) the step of preparing an alkaline aqueous polymer solution of cellulose xanthate and the water-soluble polymeric compound, (B) the step of forming a dispersion of fine particles of the alkaline aqueous polymer solution, and (C) the step of forming fine particles containing cellulose.

The first and second methods differ only in that the second polymeric compound used in the first method is anionic, while it is nonionic in the second method.

The first method of producing, the coagulated viscose particles used in this invention will be described.

According to the first method, the step (A) may be carried out by dissolving cellulose xanthate and the first water-soluble polymeric compound in water or an alkaline aqueous solution simultaneously, or by first dissolving cellulose xanthate in water or an alkaline aqueous solution and dissolving the first water-soluble polymeric compound in the resulting viscose, or by dissolving the first polymeric compound in water or an alkaline aqueous solution and then dissolving cellulose xanthate in the resulting solution.

The dissolving may be carried out by using a kneader or a high-viscosity stirring vane.

Cellulose xanthate may be one obtained as an intermediate in the rayon manufacturing process or the cellophane manufacturing process. For example, cellulose xanthate having a cellulose concentration of about 33% by weight, an alkali concentration of about 16% by weight and a gamma-value of about 40 is preferred.

Nonionic or anionic polymeric compounds, for example, are suitably used as the first water-soluble polymeric compounds. Examples of the nonionic water-soluble compound are polyethylene glycol, polyethylene glycol derivatives, and polyvinyl pyrrolidone. These polymeric compounds having a number average molecular weight of, for example, at least 400, preferably 600 to 400,000.

Examples of preferred polyethylene glycol derivatives are water-soluble compounds resulting from blocking only one of the hydroxyl groups of polyethylene glycol with an alkyl group having 1 to 18 carbon atoms, a phenyl group substituted by $C_1$–$C_{18}$ alkyl, or an acyl group having 2 to 18 carbon atoms, and A-B-A' type block copolymers (in which A and A' are identical or different and represent a polyethylene oxide block, and B represents a polyproylene oxide block). Specific examples include polyethylene glycol monomethyl ether, polyethylene glycol monolauryl ether, polyethylene glycol monocetyl ether, polyethylene glycol monomethyl phenyl ether, polyethylene glycol monononyl phenyl ether, polyethylene glycol monoacetate, polyethylene glycol monolaurate, and polyoxyethylene block/polyoxypropylene block/polyoxyethylene block copolymer.

Preferably, the anionic water-soluble polymeric compounds are those containing a sulfonic acid group, a phosphonic acid group or a carboxylic acid group as the anionic group. These anionic groups may be in the form of a free acid or a salt.

First polymeric compounds containing a sulfonic acid group as the anionic group may be derived from vinylsulfonic acid, styrenesulfonic acid, methylstyrenesulfonic acid, alllylsulfonic acid, methallylsulfonic acid, acrylamidomethacrylpropanesulfonic acid and salts thereof as monomers.

Likewise, first water-soluble polymeric compounds containing a phosphonic acid group as the anionic group may be derived from, for example, styrenephosphonic acid, vinylphosphonic group or salts of these as monomers.

First water-soluble polymeric compounds having a carboxylic acid group as the anionic group may be derived, for example, from acrylic acid, methacrylic acid, styrene-carboxylic acid, maleic acid, itaconic acid, and salts of these as monomers.

For example, the first water-soluble polymeric compound having a carboxylic acid group may be supplied as a homopolymer or a copolymer containing polymerized units of sodium acrylate by polymerizing sodium acrylate alone or a mixture of it with another copolymerizable monomer by a method known per se. Sulfonation of a homopolymer of styrene can yield a water-soluble polymeric compound containing a sulfonic acid group. The same methods may be used when the sulfonic acid is other than that derived from styrenesulfonic acid, or the carboxylic acid group is derived from other monomers.

The first water-soluble anionic polymeric compound preferably contains at least 20 mole% of polymerized units of the monomers exemplified above. Such preferred polymeric compounds include both homopolymers and copolymers.

The water-soluble anionic polymeric compounds have a number average molecular weight of preferably at least 5,000, more preferably 10,000 to 3,000,000.

The first water-soluble anionic polymeric compound used in step A is not limited to the vinyl-type polymers mentioned above, and carboxymethyl cellulose, sulfoethyl cellulose and their salts such as Na salts may also be cited as examples.

According to the first method, the alkaline aqueous polymer solution is first prepared in step A. The concentration of cellulose derived from cellulose xanthate in the aqueous polymer solution is adjusted preferably to 3 to 15% by weight, more preferably to 5 to 12% by weight. The alkali concentration of the solution is adjusted preferably to 2 to 15% by weight, more preferably 5 to 10% by weight. Furthermore, the amount of the first water-soluble polymeric compound is adjusted preferably to 0.03 to 5 parts by weight per part by weight of cellulose.

The alkaline aqueous polymer solution prepared in step A is then mixed with the second water-soluble anionic polymeric compound in step B. Mixing may be carried out by any means which can form the dispersion of fine particles of the alkaline aqueous polymer solution, for example by using mechanical stirring with a stirring vanes or baffle plate, ultrasonic stirring, and mixing by a static mixer either alone or in combination.

The second water-soluble anionic polymeric compound is used preferably as an aqueous solution, more preferably as an aqueous solution in which the concentration of the second polymeric compound is 0.5 to 25% by weight, especially preferred 2 to 22% by weight. The aqueous solution preferably has a viscosity at 20° C. of 3 to 50,000 centipoises, especially preferably 5 centipoises to 30,000 centipoises.

In mixing, 0.3 to 100 parts by weight, preferably 1 to 45 parts by weight, more preferably 4 to 20 parts by weight, of the second water-soluble anionic polymeric compound is used per part by weight of the alkaline aqueous polymer solution. Advantageously, the mixing is effected at a temperature lower than the boiling point of carbon disulfide contained in the alkaline aqueous polymer solution, preferably at 0° to 40° C.

Investigations of the present inventors have shown that when an acid-decomposable inorganic salt such as calcium carbonate is present as a dispersant in an amount of, for example, 0.5 to 5% by weight in the alkaline aqueous polymer solution in step A, the form of the fine particles in the dispersion formed in step B can be maintained well and stably.

Examples of the second water-soluble anionic polymeric compounds may be the same as those of the first anionic water-soluble polymeric compounds given hereinabove. The second water-soluble anionic polymeric compound may be identical with, or different from, the first water-soluble anionic polymeric compound.

According to the first method of producing the coagulated viscose particles, the dispersion of the fine particles formed in step (B) is coagulated in step C. Coagulation is desirably carried out while subjecting the resulting dispersion to a mixing operation.

Coagulation by heating may be advantageously carried out at a temperature above the boiling point of carbon disulfide in the alkaline aqueous polymer solution, for example at 50° to 90° C. Coagulation with a coagulating agent does not require heating to such temperatures, and usually may be carried out at a temperature of 0° to 40° C. Preferred examples of the coagulating agent are lower aliphatic alcohols, alkali metal or alkaline earth metal salts of inorganic acids, or combinations of these with third water-soluble polymeric compounds. The lower aliphatic alcohols may be linear or branched, and preferably include aliphatic alcohols having 1 to 4 carbon atoms such as methanol, ethanol, isopropanol, n-propanol and nbutanol. The alkali metal salts of inorganic acids preferably include sodium salts such as NaCl and $Na_2SO_4$ and potassium salts such as K Examples of preferred alkaline earth metal salts are magnesium salts such as $MgSO_4$ and calcium salts such as $CaC_2$.

Nonionic and anionic polymeric compounds are preferably used as the third water-soluble polymeric compound. Especially desirably, the same water-soluble polymeric compound as the second anionic polymeric compound used in step B is used as the third water-soluble polymeric compound. Examples of the third water-soluble polymeric compound may be understood from the examples of the first soluble polymeric compound given hereinabove.

The amount of the coagulating agent used is, for example, about 20 to 300% by weight based on cellulose in the viscose.

The second method of producing the coagulated viscose particles will now be described.

The second method is basically the same as the first one in that the alkaline aqueous polymer solution of cellulose xanthate and the first water-soluble polymer composition is prepared in step A, the dispersion of fine particles of the aforesaid aqueous solution is formed in step B, and fine particles containing cellulose are produced by step C. Step A in which to prepare the alkaline aqueous polymer solution of cellulose xanthate and the first water-soluble polymeric compound is carried out in the same way as described hereinabove with regard to the first method. For example, cellulose xanthate and the first water-soluble polymeric compound as described with regard to the first method may be used.

Step B for forming the dispersion of fine particles of the alkaline aqueous polymer solution is carried out by mixing the alkaline aqueous polymer solution with water-soluble polyethylene glycol having a number average molecular weight of at least 1,500 or its derivative.

Polyethylene glycol or its derivative used has a number average molecular weight of at least 1,500, preferably 1,500 to 400,000.

Examples of the polyethylene glycol derivatives are water-soluble compounds resulting from blocking only one of the hydroxyl groups of polyethylene glycol with an alkyl group having 1 to 18 carbon atoms, a phenyl group substituted by $C_1$-$C_{18}$ alkyl, or an acyl group having 2 to 18 carbon atoms, and A-B-A' type block copolymers (in which A and A' are identical or different and represent a polyethylene oxide block, and B represents a polyproylene oxide block). Specific examples include polyethylene glycol monomethyl ether, polyethylene glycol monolauryl ether, polyethylene glycol monocetyl ether, polyethylene glycol monomethyl phenyl ether, polyethylene glycol monononyl phenyl ether, polyethylene glycol monoacetate, polyethylene glycol monolaurate, and polyoxyethylene block/polyoxypropylene block/polyoxyethylene block copolymer.

Of the polyethylene glycol and its derivatives, polyethylene glycol is preferred. Polyethylene glycol has a number average molecular weight of preferably 6,000 to 200,000, especially preferably 8,000 to 100,000, and above all 10,000 to 30,000. The polyethylene glycol derivative has a number average molecular weight of preferably 1,500 to 16,000.

According to the second method, the alkaline aqueous polymer solution is first mixed with the high-molecular-weight polyethylene glycol or its derivative. Mixing may be effected by any means by which the dispersion of the fine particles of the alkaline aqueous polymer solution can be formed. Specific means are described hereinabove with regard to the first method.

The high-molecular-weight polyethylene glycol or its derivative is used preferably as an aqueous solution, more preferably as an aqueous solution in which the concentration of polyethylene glycol or its derivative is 0.5 to 60% by weight, especially preferably 5 to 55% by weight, above all 10 to 40% by weight.

The alkaline aqueous polymer solution and the polyethylene glycol or its derivative are mixed in such proportions that the amount of the polyethylene glycol or its derivative is 1 to 30 parts by weight, preferably 2 to 28 parts by weight, especially preferably 4 to 24 parts by weight, above all 8 to 16 parts by weight, per part by weight of cellulose in the aqueous solution. There is no particular restriction on the mixing temperature. Desirably, the mixing is carried out at a temperature lower than the temperature at which the dispersion of the fine particles of the alkaline aqueous polymer solution are formed. The dispersion of the fine particles of the alkaline aqueous polymer solution is formed at a temperature of at least 55° C. At temperatures lower than 55° C., it is impossible to obtain the dispersion which becomes a basis for giving desirable fine cellulose particles.

According to the second method, the dispersion formed in step B is then treated in step C to coagulate cellulose xanthate in the dispersion.

The coagulation is carried out at a temperature which is equal to, or higher than, the temperature at which the dispersion is formed in step B. Coagulation by heating or by using a coagulating agent is carried out preferably at 60° to 90° C. Coagulation with a coagulating agent may be carried out at temperatures of not more than 60° C.

The coagulating agent and its amount are the same as described hereinabove with regard to the first method. When the coagulating agent is used in combination with polyethylene glycol or its derivative, the addition of the coagulating agent has the advantage of preventing the decrease of the concentration of polyethylene glycol or its derivative in the dispersion and makes it possible to perform coagulation of cellulose xanthate in the dispersion stably.

The coagulated viscose particles obtained by the first and second methods are composed substantially of spherical or elongated spherical particle having an average particle diameter of 400 μm and contain 5 to 60% by weight of a cellulose component (calculated as cellulose). The amount of the cellulose component is measured by washing the coagulated viscose particles with an excess of n-hexane to remove water and the water-soluble polymeric compound adhering to the surface of the particles, drying the washed particles at 50° C. for 60 minutes to remove the adhering n-hexane, and then further drying the particles at 105° C. for 3 hours. When the particles contain the water-soluble polymeric compound, the particles are washed with a dilute aqueous alkali solution and then with water to remove it before measuring the content of the cellulose component. Removal of the polymeric compound from the coagulated viscose particles is carried out at a temperature of 20° to 30° C. using 0.5 to 2% by weight of sodium hydroxide and then water.

In the second step of the process of this invention, the coagulated fine viscose particles so obtained are then subjected to crosslinking reaction and then neutralized with an acid to convert the viscose into cellulose. Alternatively, the coagulated fine viscose particles are first neutralized with an acid and then subjected to crosslinking reaction. Epichlorohydrin and dichlorohydrin, for example, are used as a crosslinking agent. The crosslinking reaction is carried out by treating the coagulated fine viscose particles or the regenerated fine cellulose particles with the crosslinking agent in a liquid medium containing an alkali hydroxide. When the alkali hydroxide is sodium hydroxide, its concentration is 1 to 25% by weight, preferably 5 to 15% by weight. The concentration of the crosslinking agent in the liquid medium is adjusted to 3 to 25% by weight. Water or a water-miscible solvent for the crosslinking agent, such as methanol, ethanol or acetone, or a mixture of both may be used as the liquid medium. The amount of the liquid medium used is 10 to 30 parts by weight per part by weight of cellulose. Usually, the crosslinking reaction is carried out at a temperature of 50° to 80° C. although the temperature varies depending upon the liquid medium.

The pore volume of the inside of the crosslinked cellulose particles increases as the concentration of the alkali hydroxide and the concentration of the crosslinking agent increase. The pore diameter and the pore volume of the inside of the crosslinked cellulose particles to be submitted to heat-treatment can be adjusted by properly selecting the crosslinking conditions. The characteristic of the process of this invention is that the crystallinity of the particles hardly changes before and after the crosslinking reaction and the heat-treatment.

It is presumed that the crosslinkage among the molecular chain consists of hydroxyl-substituted alkylene groups, or hydroxyl-substituted and oxygen-interrupted alkylene groups, which bond the hydroxyl groups of the cellulose molecules to one another, and that each hydroxyl group of the cellulose molecular chains may be substituted by a grafted branch in the form of alkyl groups substituted by a hydroxyl group or by a grafted branch in the form of alkyl groups substituted by a hydroxyl group and interrupted by an oxygen atoms.

Inorganic strong acids such as sulfuric acid and hydrochloric acid are preferred as the acid used to convert the viscose into cellulose in the second step.

Then, in the third step, the crosslinked fine cellulose particles are separated from the mother liquor, and then heat-treated after they are subjected, as required, to desulfurization or washing with an acid, water or methanol.

Desulfurization can be carried out by using an aqueous solution of an alkali such as sodium hydroxide or sodium sulfide. As required, the desulfurized fine cellulose particles are washed with an acid such as dilute hydrochloric acid, water or methanol in order to remove the remaining alkali. The heat-treatment is carried out at a temperature of 60° C. to 120° C. in a dry or humid condition. A vacuum dryer, an autoclave, or a generally used hot air dryer may be used to perform the heat-treatment. It may also be carried out by using an evaporator.

Usually, a period of 20 minutes to 6 hours suffices as the heat-treatment time. The properties of the heat-treated cellulose particles differ depending upon the crosslinking conditions to which the crosslinked cellulose particles to be heat-treated have been subjected. When the concentration of the crosslinking agent is as high as 20 to 25% by weight and the concentration of the alkali hydroxide content in the liquid medium is as high as 8 to 12% by weight, the exclusion limit molecular weight of the cellulose particles can be lowered while maintaining the F value described hereinabove high. By properly selecting the crosslinking conditions, the subsequent heat-treatment can give crosslinked cellulose particles having various F values and exclusion limit molecular weights.

According to this invention, the objects and advantages of the invention are secondly achieved by fine non-crosslinked cellulose particles, wherein (a) said cellulose particles are composed substantially of a II-type cellulose crystalline phase and a non-crystalline cellulose phase, (b) said cellulose particles have a crystallinity, determined by X-ray diffractometry, of 5 to 35%, (c) said cellulose particles consist substantially of spherical to elongated spherical particles having an average particle diameter of not more than 300 $\mu$m, and (d) said cellulose particles having an exclusion limit molecular weight by polyethylene glycol of not more than 3,000.

The fine non-crosslinked cellulose particles of the invention are characterized by having the requirements (a) to (d) above. These requirements will be described below in detail.

Firstly, the fine non-crosslinked cellulose particles of the invention are composed substantially of II-type cellulose, i.e. regenerated cellulose.

Secondly, the fine non-crosslinked cellulose particles have a crystallinity, determined by X-ray diffractometry, of 5 to 35%, preferably 7 to 33%, more preferably 10 to 30%. The fine non-crosslinked cellulose particles are not amorphous, but crystalline as defined by the above crystallinity.

Thirdly, the fine non-crosslinked cellulose particles are composed substantially of spherical to elongated particles having an average particle diameter of not more than 300 $\mu$m. The non-crosslinked cellulose particles are comprised of such minute particles. Preferably, the fine cellulose particles are composed substantially of spherical to elongated spherical particles having an average particle diameter of 1 to 200$\mu$m, especially 2 to 150$\mu$m.

Fourthly, the fine non-crosslinked cellulose particles have an exclusion limit molecular weight of not more than 3,000. If the exclusion limit molecular weight exceeds 3,000, the cellulose particles have a reduced ability to separate compounds having a molecular weight of not more than 3,000 from salts. To separate compounds having lower molecular weights with good efficiency, the cellulose particles preferably have an exclusion limit molecular weight of not more than 2,500, more preferably not more than 2,000, especially preferably not more than 1,500.

Secondarily, the fine non-crosslinked cellulose particles of this invention are further characterized by the following properties.

Preferably, the cellulose constituting the fine non-crosslinked cellulose particles of this invention have a degree of polymerization of usually 100 to 700. If it exceeds 700, the fine cellulose particles tend to be deformed and it is difficult to obtain uniform particles.

Preferably, the fine crosslinked cellulose particles of this invention have a fractionation index (F) defined hereinabove of at least 0.6, preferably at least 0.8. More preferably, the invention can give fine noncrosslinked cellulose particles having a fractionation index of at least 1.0. Furthermore, the fine non-crosslinked cellulose particles have a fractionation index of preferably at most 2, more preferably at most 1.5.

Further, it is preferred that the fine non-crosslinked cellulose particles have a pressure resistance in the wet state of at least 5 kg/cm$^2$, particularly at least 10 kg/cm$^2$ when packed into a column. According to this invention, fine non-crosslinked cellulose particles having a pressure resistance in the wet state of at least 10 kg/cm$^2$, more preferably at least 40 kg/cm$^2$, especially preferably at least 80 kg/cm$^2$ can be produced. In a given column, the pressure of the column increases with decreasing particle diameter of the fine cellulose particles. Fine cellulose particles of this invention having a particle diameter of 10/$\mu$m can withstand a column pressure of 80 kg. The invention, therefore, has the great advantage that it permits selection of various particle diameters depending upon the desired separation accuracy and the amount of materials to be treated.

The fine non-crosslinked cellulose particles of the invention have a copper value of not more than 3, and also have the advantage that they have a low carboxyl group content and adsorption ascribable to their ionic character is little.

Basically, the fine non-crosslinked cellulose particles of this invention can be produced by the same process as the process for producing the crosslinked cellulose particles of the invention described hereinabove.

The fine non-crosslinked cellulose particles can be produced by a first step of removing part of water from coagulated fine viscose particles containing a water-soluble polymeric compound, a second step of neutralizing the dehydrated fine coagulated viscose particles with an acid to convert the viscose to cellulose, and a step of removing the water-soluble polymeric compound from the fine particles.

The fine coagulated viscose particles containing the water-soluble compound used in the first step can be produced by the same methods as used to produce the fine coagulated viscose particles used in the first step of the process for producing the fine crosslinked cellulose particles.

In the first step of the process for producing the fine non-crosslinked cellulose particles, part of water is removed from the fine coagulated viscose particles.

The resulting fine coagulated viscose particles are composed substantially of spherical to elongated spherical particles having an average particle diameter of 400 μm, and contains 10 to 60% by weight of a cellulose component (calculated as cellulose), 90 to 35% by weight of water, and 0 to 5% by weight of the water-soluble polymeric compound. The proportion of the cellulose component in the fine coagulated viscose particles is determined after washing the fine particles with an excess of n-hexane to remove water and the water-soluble polymeric compound adhering to the surface of the fine particles, drying the particles at 50° C. for 60 minutes to remove the adhering n-hexane, and further drying the particles at 105° C. for 3 hours. When the particles contains the water-soluble polymeric compound, the particles are washed with water to remove the polymeric compound before the proportion of the cellulose component is measured.

The fine coagulated viscose particles used in the first step have water or the water-soluble polymeric compound adhering to their surface, or have no such adhering matter as a result of washing with n-hexane. Removal of water from the fine coagulated viscose particles is carried out by using a concentrated aqueous solution of an inorganic salt or a hydrophilic medium.

The concentrated aqueous solution of the inorganic salt is preferably a saturated or oversaturated aqueous solution of such an inorganic salt as sodium sulfate, ammonium sulfate or calcium chloride.

The hydrophilic medium is, for example, an aliphatic alcohol such as butanol or isobutyl alcohol, a polyhydric alcohol such as ethylene glycol or glycerol, a ketone such as diethyl ketone, or an acid amide such as dimethylformamide or acetamide.

Removal of water is carried out at a temperature of 30° to 90° C., preferably 50° to 80° C. Water is removed preferably as slowly as possible, and the temperature is selected depending upon the amount of water in the coagulated viscose particles used. When, temperatures above 90° C. are undesirable because water is removed abruptly at such high temperatures.

In the second step of the process of the invention, the fine coagulated viscose particles from which part of water has been removed in the first step are then neutralized with an acid in the second step to convert the viscose into cellulose. An inorganic strong acid such as sulfuric acid and hydrochloric acid is preferably used as the acid. The amount of the acid neutralizing agent is one sufficient to neutralize the viscose and convert it to cellulose.

The water-soluble compound is effected also during the removal of water or during neutralization. In the third step, however, the cellulose particles are further treated to remove the water-soluble polymeric compound. This is achieved, for example, by washing the cellulose particles with water or methanol. To remove it completely, a combination of washing with hot water and washing with methanol is preferably employed.

In the third step, the fine cellulose particles are separated from the mother liquor, and as required, desulfurized, washed with an acid or water, or dried.

Desulfurization may be carried out by using an aqueous solution of an alkali such as sodium hydroxide and sodium sulfide. As required, the cellulose particles are washed with an acid such as dilute hydrochloric acid and with water, and dried to remove the remaining alkali.

As stated above, the fine cellulose particles of this invention have an exclusion limit molecular weight of not more than 4,000, and relatively good stability to chemicals and good pressure resistance. Hence, they can be suitably used as a liquid chromatographic filler for desalting proteins.

The following Examples illustrate the present invention in greater detail.

The various properties described in the present specification are measured by the following methods.

Absorbance of a CH stretching absorption band

One to 3 mg of the fine cellulose particles are precisely weighed, and abut 200 mg of a potassium bromide powder (KBr for short) for infrared absorption spectroscopy is precisely weighed. The two materials are kneaded and pulverized in an agate mortar. The mixture is gathered and tabletted by a tabletting machine to form KBr tablets for infrared absorption spectroscopy. The infrared absorption spectrum by transmission of the fine cellulose particles is measured. In the resulting infrared spectrum, the absorbance of a CH stretching absorption band having a peak at 2800 to 3000 cm$^{-1}$ is measured and converted to a value per mg of cellulose. The absorbance ($A_o$) of the CH stretching absorption band per mg of cellulose is defined by the following equation.

$$A = \log_{10} T(b)/T(p)$$

$$A_o = \frac{A(M + w)}{m \cdot w}$$

wherein
w is the amount (mg) of the fine cellulose particles,
M is the amount (mg) of the KBr powder,
m is the amount (mg) of the KBr tablet,
A is the absorbance of the CH stretching absorption band,
T(p) is the transmittance (%) at the peak top of the CH stretching absorption band, and
T(b) the transmittance (%) of the baseline at the peak wavenumber of the CH stretching absorption band.

The baseline is provided by drawing a line tangent to both the OH stretching absorption band and the CH stretching absorption band in the range of 2000 to 4000 cm$^{-1}$ in such a manner as to scoop up the skirts of these bands.

Crystallinity

Measured by the method of measuring the crystallinity of cellulose by X-ray diffraction as described at pages 113 to 119 of "Sen-i Gakkai Shi" (Journal of Textile Society), Vol. 19, No. 2 (1963). Specifically, X-ray diffraction curves from $2\theta = 5°$ to $2\theta = 45°$ are determined, and the crystallinity is calculated in accordance with the following equation.

$$\text{Crystallinity (\%)} = \frac{C}{T} \times 100$$

wherein $$T = \{(a+C) - b\} \times K$$

K = 0.896 (a correction coefficient for non-interfering scattering of cellulose)
C = c − a
a is the area of diffraction curves (2θ = 5 − 45°) of amorphous starch,
b is the area of air scattering curves (2θ = 5 − 45°), and
c is the area of diffraction curves (2θ = 5 − 45°) of the sample.

Average degree of polymerization

Measured in accordance with the method of JIS L-1015.

Average particle diameter

About 0.1 g of the sample is taken, and put in 25 ml of deionized water, and dispersed with stirring. The average particle diameter of the sample is measured by a light transmission type particle size distribution analyzer.

Molecular weight fractionation characteristics

The fine cellulose particles are filled each in stainless steel columns having a diameter of 8 mm and a length of 25 cm over 30 minutes at a flow rate of 2.0 ml/min. using water as a filling liquid. The filled columns are used as separation columns. Standard polyethylene glycol of a known molecular weight is charged onto the columns under the following analysis conditions, and the elution time and the molecular weight are plotted. The exclusion limit molecular weight of the fine cellulose particles is determined as the molecular weight of polyethylene glycol at a deflection point of the curve.

The fractionation index (F)

$$F = \frac{V_E - V_D}{V_D}$$

wherein $V_D$ is the volume (ml) of blue dextran (molecular weight 2 million) eluted, and $V_E$ is the volume (ml) of ethylene glycol eluted.

Analysis conditions

1. Pump: HLC-803D made by Toyo Soda Industry Co., Ltd.
2. Eluent: deionized water
3. Flow rate: 1.0 ml/min.
4. Temperature: room temperature
5. Detector: RI detector Copper value Measured by the method described in JIS-P-1801-1961.

EXAMPLE 1

Five hundred grams of pulp composed of coniferous tree was steeped for 1 hour with 20 liters of an 18% by weight aqueous solution of sodium hydroxide at 20° C., and squeezed to 2.8 times. While the temperature was raised from 25° C. to 50° C., the pulp was shredded for 1 hour and aged. Then, 33% by weight, based on cellulose, of carbon disulfide (165 g) was added and sulfurization was carried out at 25° C. for 1 hour to form cellulose xanthate. The cellulose xanthate was dissolved in an aqueous solution of sodium hydroxide to obtain a viscose having a cellulose concentration of 9.3%, a sodium hydroxide concentration of 5.9% by weight, and a viscosity of 6,200 centipoises.

The viscose (120 g) and 480 g of an aqueous solution of poly(sodium acrylate) (polymer concentration 2% by weight, molecular weight 50,000) as an anionic polymeric compound were put in a 1-liter flask. The mixture was stirred at a liquid temperature of 30° C. by a labostirrer (Model LR-51B made by Yamato Science Co.; rotating blade 7 cm) for 10 minutes at 600 rpm to form fine particles of the viscose. Subsequently, with stirring, the liquid temperature was raised from 30° C. to 70° C. over 15 minutes, and the mixture was maintained at 70° C. for 10 minutes to coagulate the fine viscose particles. The resulting coagulated viscose particles were separated from the mother liquor by a 1G4-type glass filter. The resulting coagulated viscose particles had a particle diameter of 80μm and contained 45% by weight (calculated as cellulose) of a cellulose component.

Then, the coagulated viscose particles were washed with a 0.5% by weight aqueous solution of sodium hydroxide. Then, 60 g of the washed coagulated viscose particles were separated by a 1G4-type glass filter, and crosslinked at 60° C. for 3 hours with stirring in 1 liter of an 8% by weight aqueous solution of sodium hydroxide containing 20% by weight of epichlorohydrin. Subsequently, by a glass filter, the crosslinked cellulose particles were separated from the mother liquor and neutralized with 5% by weight hydrochloric acid to form fine crosslinked cellulose particles. They were washed with a large excess of water and then with methanol, and heat-treated in an air-circulating type dryer at 105° C. for 5 hours. The properties of the resulting fine crosslinked cellulose particles are shown in Table 1 (Run No. 1).

Figure 4:
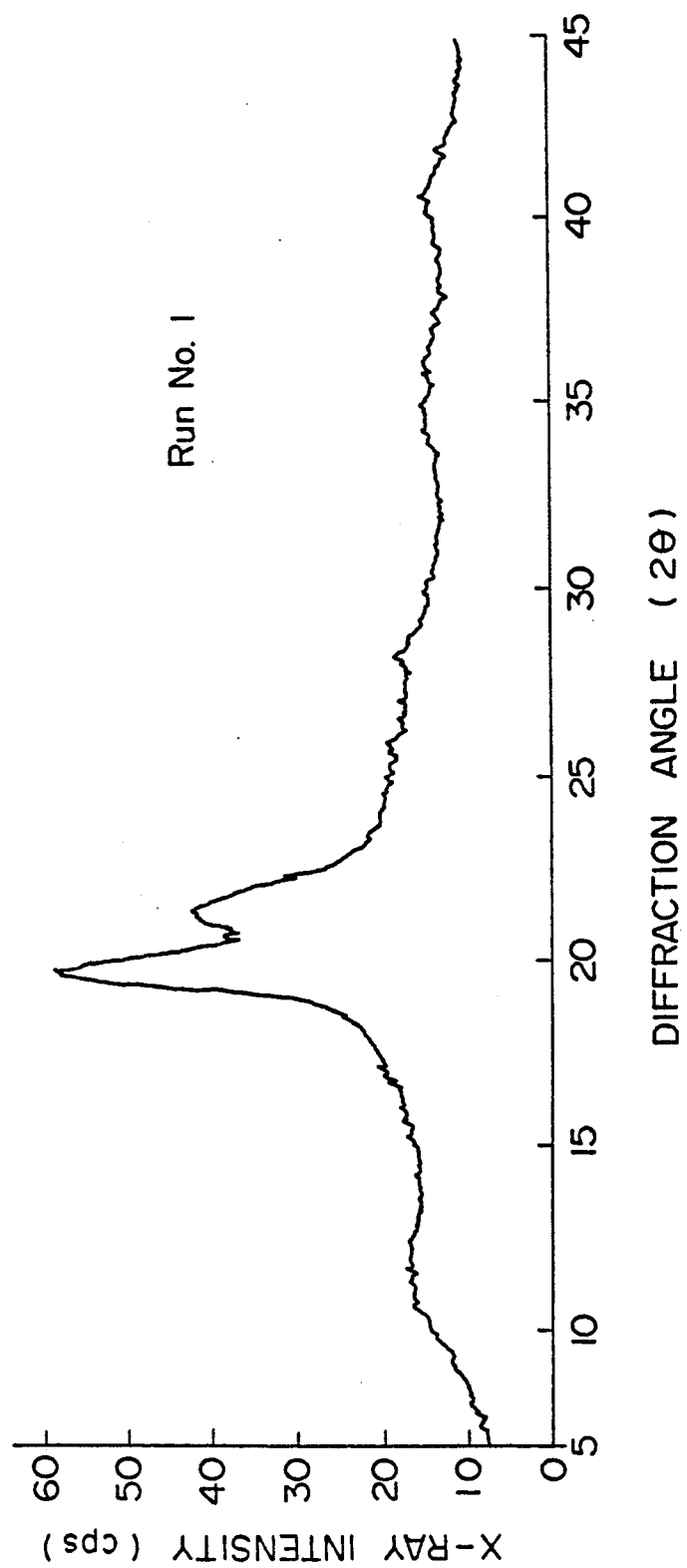
FIG. 4 is an X-ray diffraction pattern of the fine crosslinked cellulose particles obtained in Run No. 1 (Example 1).

The molecular weight fractionation characteristics of the cellulose particles are shown in FIG. 1, and their X-ray diffraction pattern, in FIG. 4.

TABLE 1

| Run No. | 1 |
| --- | --- |
| Crystal form | II |
| Absorbance of the CH stretching absorption band ($mg^{-1} \cdot cm^{-2}$) | 0.0765 |
| Crystallinity | 25 |
| Shape | true sphere |
| Average particle diameter (μm) | 64 |
| Exclusion limit molecular weight | 2,000 |
| F value | 0.90 |
| Degree of polymerization | 280 |

EXAMPLE 2

Figure 2:
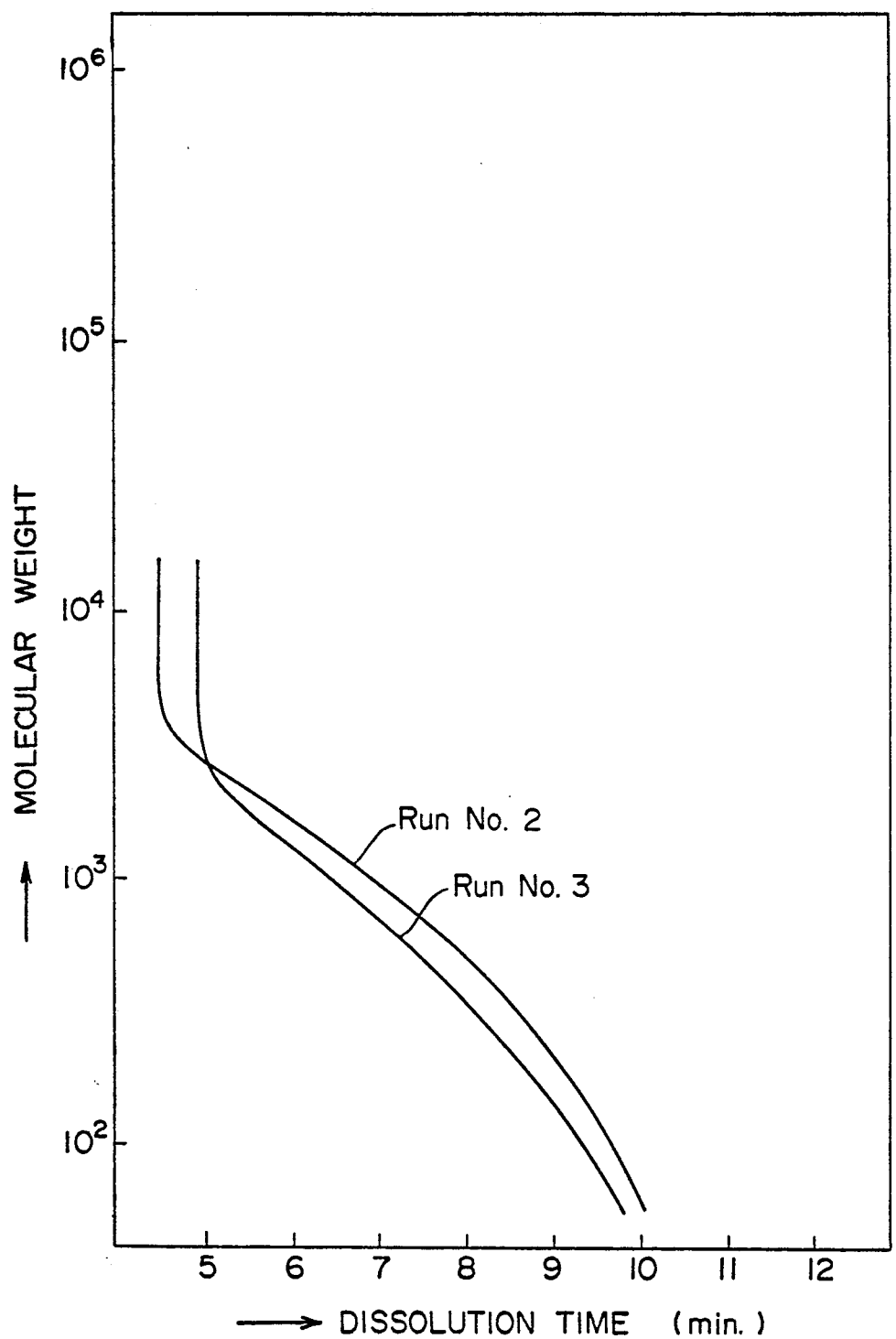
FIG. 2 is a diagram showing the separating function of the fine crosslinked cellulose particles obtained in Runs Nos. 2 and 3 (Example 2) as a liquid chromatographic filler.

Example 1 was repeated except that the concentration of epichlorohydrin was changed to 5, 15, and 25% by weight (Runs Nos. 2, 3 and 4, respectively). The molecular weight fractionation characteristics of the products obtained in Runs Nos. 2 and 3 are shown in FIG. 2.

EXAMPLE 3

The coagulated cellulose particles obtained in Example 1 were neutralized with 5% by weight hydrochloric acid and separated by a glass filter. The neutralized coagulated particles were crosslinked at 60° C. for 3 hours in a 10% by weight aqueous solution of sodium hydroxide containing 20% by weight of epichlorohydrin. Subsequently, the crosslinked particles were collected by filtration through a glass filter, washed with water and then with methanol, and heat-treated under the same conditions as in Example 1 (Run No. 5). The properties of the resulting crosslinked cellulose particles are shown in Table 2.

EXAMPLE 4

Cellulose xanthate obtained in Example 1 was dissolved in an aqueous solution of sodium hydroxide, and 500 g of polyethylene glycol having a molecular weight of 6,000 was added and dissolved in the solution to prepare an alkaline aqueous solution of cellulose xanthate and polyethylene glycol having a cellulose concentration of 9.3% by weight, a sodium hydroxide concentration of 6.1% by weight, a polyethylene glycol concentration of 9.1% by weight and a viscosity of 7,400 centipoises. The alkaline aqueous polymer solution prepared above (60 g) and 240 g of an aqueous solution of polysodium acrylate (polymer concentration 12% by weight, molecular weight 50,000) were put in a 500 ml flask, and the total amount of these materials was adjusted to 300 g. By the same method as in Example 1, the fine particles of viscose containing polyethylene glycol were coagulated. The coagulated viscose particles were separated from the mother liquor by a 1G4-type glass filter. Thereafter, the coagulated viscose particles were washed with a 0.5% by weight aqueous solution of sodium hydroxide to remove polyethylene glycol. The resulting coagulated viscose particles had a particle diameter of 35 μm and contained 31% by weight of a cellulose component. Sixty grams of the resulting coagulated viscose particles were crosslinked at 60° C. for 3 hours with stirring in 500 ml of a 5% aqueous solution of sodium hydroxide containing 25% by weight of epichlorohydrin. Subsequently, the crosslinked product was treated as in Example 1 to give fine crosslinked cellulose particles (Run No. 6). The properties of the resulting cellulose particles are shown in Table 2.

EXAMPLE 5

Thirty grams of the viscose obtained in Example 1 and 270 g of an aqueous solution of polysodium acrylate (polymer concentration 14% by weight, molecular weight 700,000) as an anionic polymeric compound were put in a 500 ml flask. The mixture was stirred for 10 minutes at 800 rpm by a labostirrer to form fine particles of viscose. Subsequently, with stirring, the temperature of the liquid was raised from 30° C. to 70° C. over 15 minutes, and the mixture was then maintained at 70° C. for 10 minutes to coagulate the fine viscose particles. The coagulated viscose particles had a particle diameter of 20μm and contained 50% by weight (calculated as cellulose) of a cellulose component.

The resulting coagulated viscose particles were treated as in Example 1 to give fine crosslinked cellulose particles (Run No. 7).

The properties of the resulting fine crosslinked cellulose particles are shown in Table 3.

Figure 3:
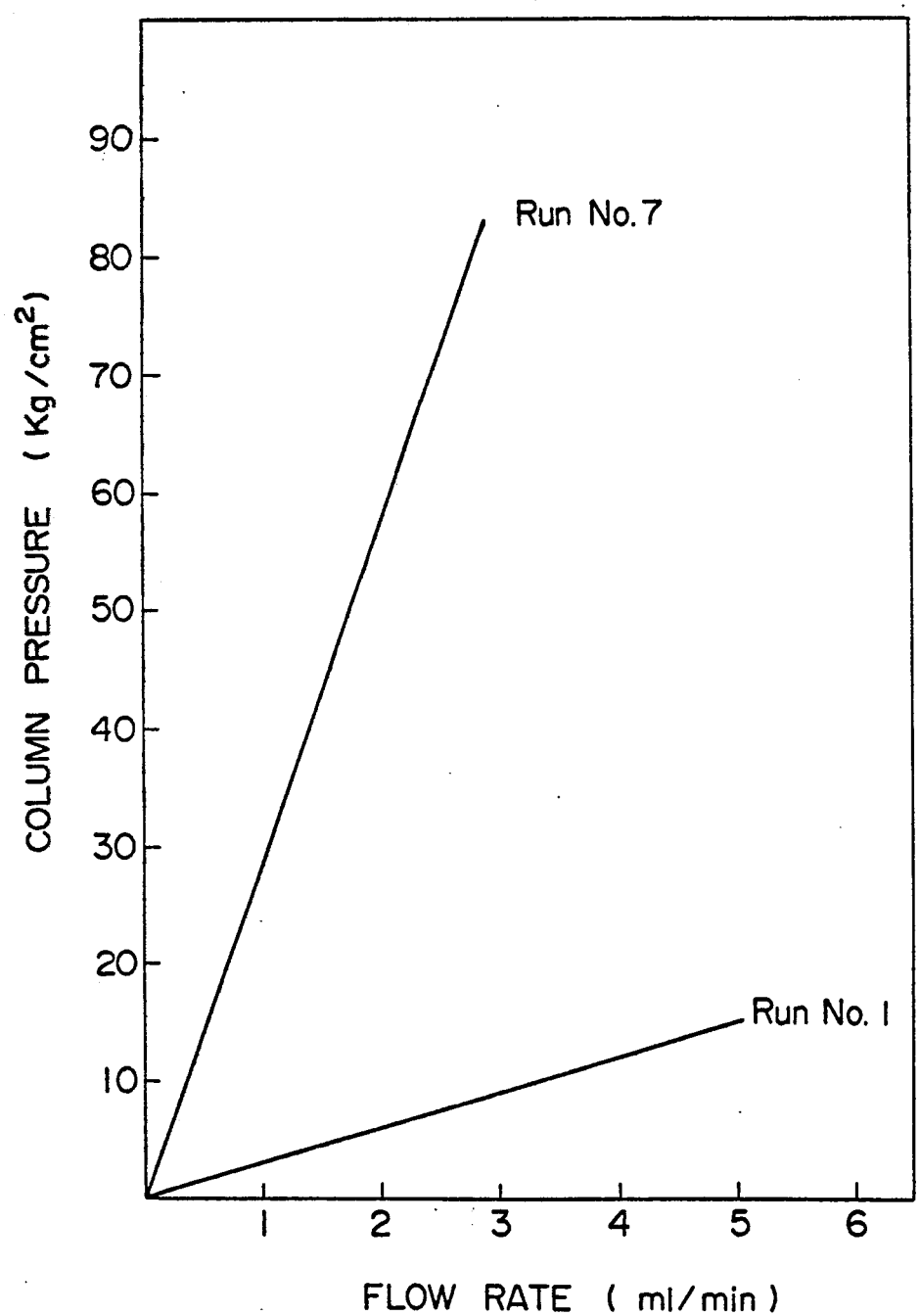
FIG. 3 is a diagram showing the relation between the column pressure and the flow rate, which shows the pressure resisting function of the fine crosslinked cellulose particles of the invention obtained in Run No. 1 (Example 1) and Run No. 7 (Example 5).

The fine crosslinked cellulose particles obtained in this example are outstandingly characterized by their excellent pressure resistance, as shown in FIG. 3.

EXAMPLE 6

Sixty grams of the viscose obtained in Example 1 and 240 g of an aqueous solution of polyethylene glycol (polymer concentration 40% by weight, molecular weight 20,000) were put in 500 ml of a flask.

The mixture was stirred at a liquid temperature of 30° C. and 1000 rpm by a labostirrer. The liquid temperature was then raised from 30° C. for 15 minutes, and the mixture was maintained at 70° C. for 30 minutes to coagulate the fine viscose particles. The resulting coagulated viscose particles had a particle diameter of 18μm and contained 48% by weight (calculated as, cellulose) of a cellulose component.

The coagulated viscose particles were treated as in Example 1 (Run No. 8). The properties of the resulting fine crosslinked cellulose particles are shown in Table 3.

TABLE 2

| Run No. | 2 | 3 | 4 | 5 | 6 |
|---|---|---|---|---|---|
| Crystal form | II | II | II | II | II |
| Absorbance of the CH stretching absorption band ($mg^{-1} \cdot cm^{-2}$) | 0.0852 | 0.0910 | 0.1064 | 0.0812 | 0.0725 |
| crystallinity | 27 | 28 | 31 | 26 | 32 |
| Shape | true sphere | true sphere | true sphere | true sphere | true sphere |
| Average particle diameter (μm) | 76 | 70 | 68 | 75 | 76 |
| Exclusion limit molecular weight | 4,000 | 2,500 | 1,500 | 3,500 | 1,800 |
| F value | 1.25 | 0.96 | 0.70 | 1.18 | 0.75 |
| Degree of polymerization | 275 | 278 | 280 | 270 | 275 |

TABLE 3

| Run No. | 7 | 8 |
|---|---|---|
| Crystal form | II | II |
| Absorbance of the CH stretching absorption band ($mg^{-1} \cdot cm^{-2}$) | 0.0742 | 0.0801 |
| Crystallinity | 30 | 33 |
| Shape | true sphere | true sphere |
| Average particle diameter (μm) | 9.3 | 10.2 |
| Exclusion limit molecular weight | 3,000 | 2,500 |
| F value | 1.02 | 0.85 |
| Degree of polymerization | 280 | 275 |

EXAMPLE 7

Coagulated viscose particles (particle diameter 50 μm, cellulose component 45% by weight, water 55% by weight) were obtained in the same way as in Example 1 except that they were separated from the mother liquor by using a centrifugal filter (3000 G)., The resulting coagulated viscose particles were dehydrated in a saturated aqueous solution of sodium sulfate at 80° C. for 60 minutes. The resulting dehydrated and coagulated viscose particles contained 60% by weight (calculated as cellulose) of the cellulose component and 40% by weight of water. The dehydrated coagulated viscose particles were neutralized and regenerated with sulfuric acid (100 g/liter) to convert the viscose to cellulose. Subsequently, the fine cellulose particles were separated from the mother liquor through a 1G4-type glass filter, desulfurized with about 2 liters of an aqueous solution of sodium hydroxide (2 g/liter) at 50° C., neutralized with an aqueous solution of sulfuric acid (2 g/liter), washed with a large excess of water, and dried at 105° C. for 5 hours to give fine cellulose particles (Run No. 9). The properties of the fine cellulose particles are shown in Table 4.

TABLE 4

| Run No. | 9 |
| --- | --- |
| Crystal form | II |
| Crystallinity (%) | 31 |
| Shape | true sphere |
| Average particle diameter (μm) | 66 |
| Average degree of polymerization | 280 |
| Copper value | 0.4 |

EXAMPLE 8

The coagulated viscose particles obtained in Example 7 were dehydrated in a saturated solution of ammonium chloride at 80° C. for 60 minutes. The resulting dehydrated and coagulated viscose particles contained 55% by weight of a cellulose component and 45% by weight of water. The dehydrated coagulated viscose particles were treated in Example 7 to give fine cellulose particles (Run No. 10). Their properties are shown in Table 5.

TABLE 5

| Run No. | 10 |
| --- | --- |
| Crystal form | II |
| Crystallinity (%) | 30 |
| Shape | true sphere |
| Average particle diameter (μm) | 64 |
| Average degree of polymerization | 280 |
| Copper value | 0.4 |

EXAMPLE 9

The coagulated viscose particles obtained in Example 7 were dehydrated in ethylene glycol at 80° C. for 60 minutes. The resulting dehydrated and coagulated viscose particles contained 61% by weight of a cellulose component and 49% by weight of water. The dehydrated coagulated viscose particles were treated in example 7 to give fine cellulose particles (Run No. 11). Their properties are shown in Table 6.

TABLE 6

| Run No. | 11 |
| --- | --- |
| Crystal form | II |
| Crystallinity (%) | 31 |
| Shape | true sphere |
| Average particle diameter (μm) | 67 |
| Average degree of polymerization | 275 |
| Copper value | 0.5 |

EXAMPLE 10

The cellulose xanthate obtained in Example 1 was dissolved in an aqueous solution of sodium hydroxide, and 50 g of polyethylene glycol having a molecular weight of 6,000 was added and dissolved to prepare an alkaline aqueous solution of cellulose xanthate and polyethylene glycol. The alkaline aqueous polymer solution had a cellulose concentration of 9.3% by weight, a sodium hydroxide concentration of 6.1% by weight, a polyethylene glycol concentration of 0.9% by weight, and a viscosity of 7,400 centipoises. Sixty grams of the resulting alkaline aqueous polymer solution and 240 g of an aqueous solution of polysodium acrylate (polymer concentration 12% by weight, molecular weight 50,000) as an anionic polymeric compound. The fine viscose particles containing polyethylene glycol were coagulated in the same way as in Example 7. The resulting coagulated viscose particles were separated from the mother liquor by a centrifugal filter (3000 G). The resulting coagulated viscose particles had a particle diameter of 85 μm and contained 45% by weight of a cellulose component, 53% by weight of water and 2% by weight of polyethylene glycol.

The coagulated viscose particles were dehydrated in a saturated aqueous solution of sodium sulfate at 80° C. for 60 minutes. The dehydrated and coagulated viscose particles contained 60% by weight of the cellulose component, 39% by weight of water and 1% by weight of polyethylene glycol.

The dehydrated coagulated viscose particles containing polyethylene glycol were neutralized and regenerated in sulfuric acid (100 g/liter) to convert the viscose to cellulose. The cellulose particles containing polyethylene glycol were separated from the mother liquor, desulfurized with about 2 liters of an aqueous solution of sodium hydroxide (2 g/liter) at 50° C., neutralized with an aqueous solution of sulfuric acid (2 g/liter), washed with a large excess of water to remove polyethylene glycol from the fine cellulose particles, and dried at 105° C. for 5 hours to obtain fine cellulose particles having the properties shown in Table 7 (Run No. 12).

TABLE 7

| Run No. | 12 |
| --- | --- |
| Crystal form | II |
| Crystallinity (%) | 27 |
| Shape | true sphere |
| Average particle diameter (μm) | 72 |
| Average degree of polymerization | 268 |
| Copper value | 0.5 |

EXAMPLE 11

Example 10 was repeated except that polysodium styrenesulfonate having a molecular weight of 10,000 instead of the polyethylene glycol (Run No. 13).

The properties of the resulting fine cellulose particles are shown in Table 8.

TABLE 8

| Run No. | 13 |
|---|---|
| Crystal form | II |
| Crystallinity (%) | 29 |
| Shape | true sphere |
| Average particle diameter (μm) | 70 |
| Average degree of polymerization | 280 |
| Copper value | 0.4 |

EXAMPLE 12

Thirty grams of the viscose obtained in Example and 270 g of an aqueous solution of polysodium styrene-sulfonate (polymer concentration 14% by weight, molecular weight 500,000) as an anionic polymeric compound were put in a 500 ml flask. These materials were stirred for 10 minutes at a liquid temperature of 30° C. and 1000 rpm to form fine viscose particles. Subsequently, with stirring, the temperature was raised from 30° C. to 70° C. over the course of 15 minutes, and the fine particles of viscose were coagulated by maintaining them at 70° C. for 10 minutes. The resulting coagulated viscose particles had a particle diameter of 20 μm and contained 50% by weight (calculated as cellulose) and 50% by weight of water.

The coagulated viscose particles were then treated as in Example 7 to give fine cellulose particles (Run No. 14). The properties of the fine cellulose particles are shown in Table 9.

TABLE 9

| Run No. | 14 |
|---|---|
| Crystal form | II |
| Crystallinity (%) | 30 |
| Shape | true sphere |
| Average particle diameter (μm) | 12 |
| Average degree of polymerization | 276 |
| Copper value | 0.5 |

EXAMPLE 13

The fine cellulose particles obtained in each of Examples 7 to 12 were filled in a stainless steel column having a diameter of 8 mm and a length of 25 cm using water as a filling liquid at a flow rate of 2.0 ml/min. over 30 minutes. Then, the filled column was used as a separation column and standard polyethylene glycol was charged onto the column under the analysis conditions described hereinabove. The relation between the elution time and the molecular weight was examined. The results are shown in Table 10.

TABLE 10

| Fine cellulose particles in Run No. | Exclusion limit molecular weight | Fractionation index (F value) |
|---|---|---|
| 9 | 1200 | 0.61 |
| 10 | 1500 | 0.64 |
| 11 | 1400 | 0.60 |
| 12 | 3000 | 0.80 |
| 13 | 2500 | 0.85 |
| 14 | 2800 | 1.12 |

Figure 5:
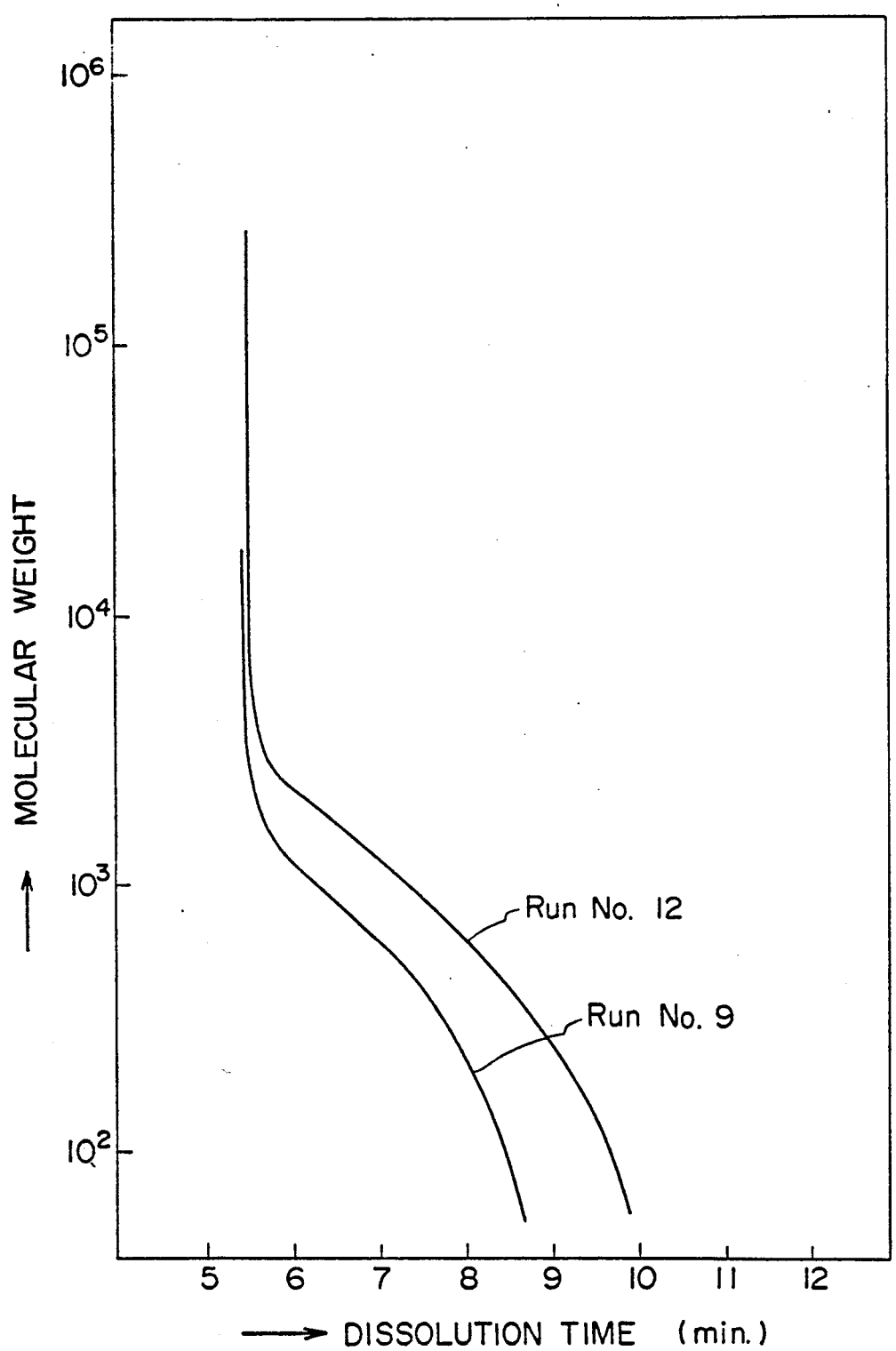
FIG. 5 is a diagram showing the relation between the molecular weight of polyethylene glycol and the elution time, which shows the separating functions of the fine non-crosslinked cellulose particles of the invention obtained in Run No. 9 (Example 7) and Run No. 12 (Example 10) as a liquid chromatographic filler.

FIG. 5 shows the relation of the molecular weight of polyethylene glycol and the elution time with regard to the fine cellulose particles obtained in Runs Nos. 9 and 12.

Figure 6:
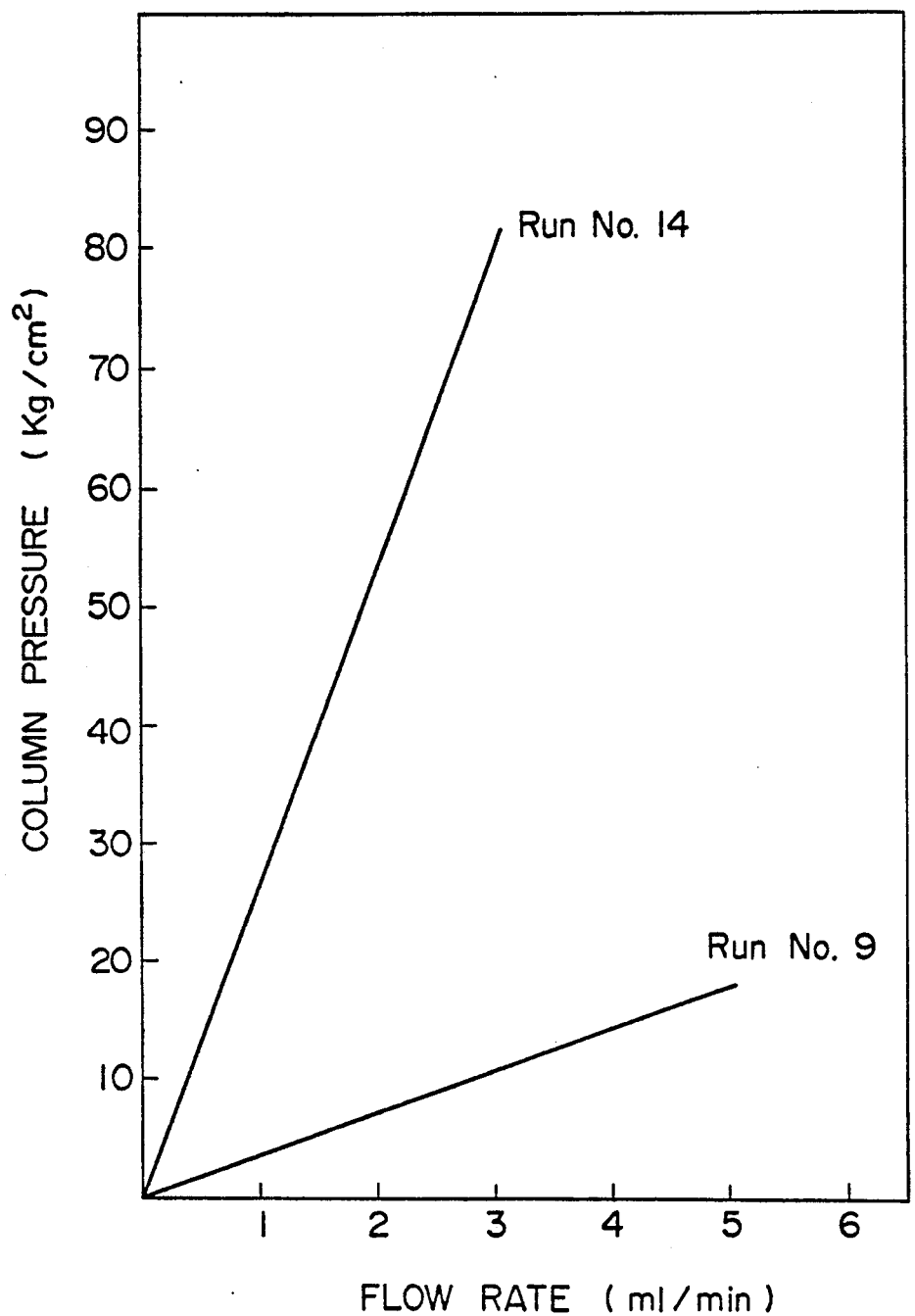
FIG. 6 is a diagram showing the relation between the column pressure and the flow rate, which shows the pressure resisting functions of the fine non-cross-linked cellulose particles obtained in Run No. 9 (Example 7) and Run No. 14 (Example 12).

The fine cellulose particles obtained in each of (Run No. 9, 66 μm) and Example 12 (Run No. 14, 12 μm) were filled in s stainless column having a diameter of 8 mm and a length of 25 cm. Using deionized water as an eluent, the relation between the flow rate and the column pressure was examined. As shown in FIG. 6, the particles of Run No. 14 having a particle diameter of 12 μm could be pressurized to 80 kg/cm$^2$ and used at high flow rates.

What is claimed is:

1. A process for producing crosslinked cellulose particles which comprises the steps of:
   (1) preparing particles of a coagulated viscose containing 5 to 60% by weight, calculated as cellulose of cellulose xanthate by coagulating said cellulose xanthate, said particles having an average particle diameter of not more than 400 μm;
   (2) subjecting the particles of coagulated viscose to a crosslinking reaction with a crosslinking agent in a liquid medium containing an alkali hydroxide to cause crosslinking of the cellulose molecular chains within said particles, and neutralizing said particles with an acid, or first neutralizing the particles with an acid and then subjecting the neutralized particles to said crosslinking reaction; and
   (3) separating the crosslinked particles and heating them at a temperature of from 60 to 120° C.

2. The process of claim 1 wherein the crosslinking reaction in step (2) is carried out in a liquid medium containing 1 to 15% by weight of an alkali hydroxide.

3. The process of claim 2 wherein the alkali hydroxide is sodium hydroxide or potassium hydroxide.

4. The process of claim 2 wherein the liquid medium is an aqueous medium composed of water and a water-miscible organic solvent capable of dissolving the crosslinking agent.

5. The process of claim 2 wherein the liquid medium is water.

6. The process of claim 1 wherein said crosslinked particles are desulfurized prior to being heated.

7. The process of claim 1, wherein said crosslinked particles are washed with a member selected from the group consisting of an acid, water and meth and prior to being heated.

8. The process of claim 1, wherein the cross-linking reaction is carried out at a temperature of from 50° to 80° C.

* * * * *

UNITED STATES PATENT AND TRADEMARK OFFICE
CERTIFICATE OF CORRECTION

PATENT NO. : 5 064 950
DATED : November 12, 1991
INVENTOR(S) : Shigeru OKUMA et al It is certified that error appears in the above-identified patent and that said Letters Patent is hereby corrected as shown below:

Column 24, line 30; after "as cellulose" insert a comma.
           line 59; change "meth and" to ---methanol---.
           line 61; change "cross-linking" to
                 ---crosslinking---.

Signed and Sealed this

Twenty-fifth Day of May, 1993

Attest:

MICHAEL K. KIRK

*Attesting Officer*        *Acting Commissioner of Patents and Trademarks*